Dec. 15, 1931. G. R. STEERE Re. 18,292

CHARGING MACHINE

Original Filed Sept. 18, 1925 2 Sheets-Sheet 1

George R. Steere
INVENTOR

BY James B. L. Crane

ATTORNEY

Dec. 15, 1931. G. R. STEERE Re. 18,292

CHARGING MACHINE

Original Filed Sept. 18, 1925 2 Sheets-Sheet 2

George R. Steere
INVENTOR

BY James B. Crane

ATTORNEY

Reissued Dec. 15, 1931

Re. 18,292

UNITED STATES PATENT OFFICE

GEORGE R. STEERE, OF OWOSSO, MICHIGAN, ASSIGNOR, BY MESNE ASSIGNMENTS, TO SEMET-SOLVAY ENGINEERING CORPORATION, OF NEW YORK, N. Y., A CORPORATION OF NEW YORK

CHARGING MACHINE

Original No. 1,608,680, dated November 30, 1926, Serial No. 57,199, filed September 18, 1925. Application for reissue filed December 8, 1927. Serial No. 238,706.

This invention relates to charging machines and more particularly to an automatic machine for charging gas generators.

One object of this invention is to provide a device for automatically charging a generator of a gas producing plant or set, the operation of which does not deleteriously affect the gas-make thereby increasing the capacity and efficiency of the plant or set.

Another object of this invention is to provide a charging machine that can supply weighed or predetermined amounts of fuel to any desired portion of the fuel bed in the generator of the gas plant. Preferably small amounts at frequent intervals are deposited at predetermined portions of the fuel bed thereby maintaining uniform conditions therein throughout the operation of the gas generator.

A further object of this invention is to provide a charging machine that can be readily and quickly secured to or removed from the charging opening of the gas generator.

This invention comprises a charging machine having a spreader adapted to be positioned within the charging opening of a gas generator in combination with means to intermittently move the spreader to direct fuel to a predetermined portion of the fuel bed in the generator.

Figure 1:
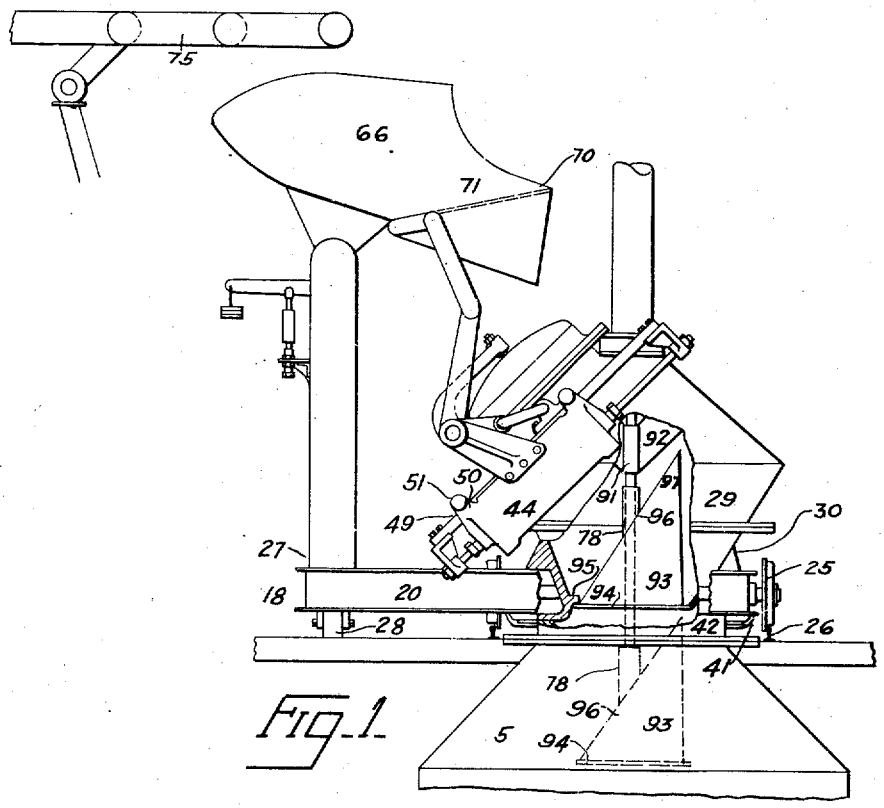
Figure 2:
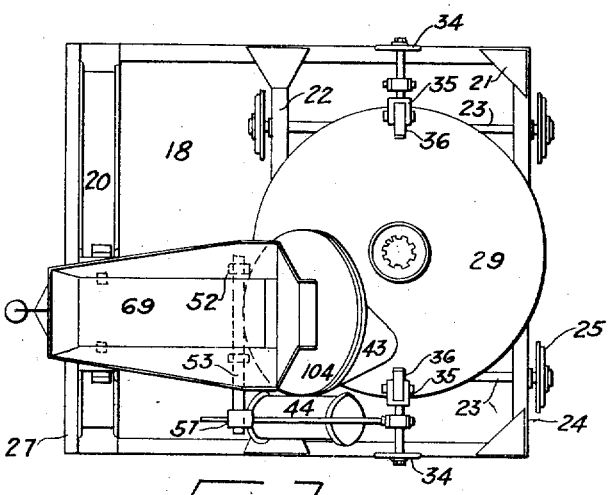
Figure 6:
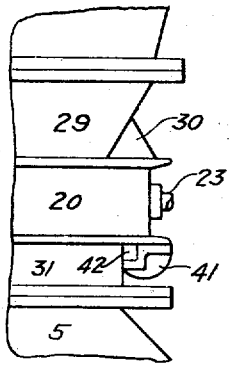
Figure 4:
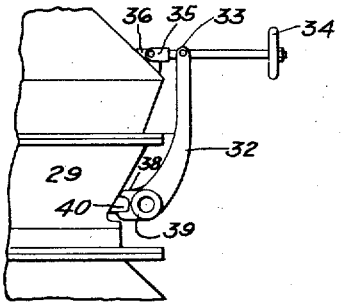
Figure 5:
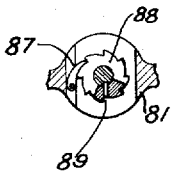
Figure 3:
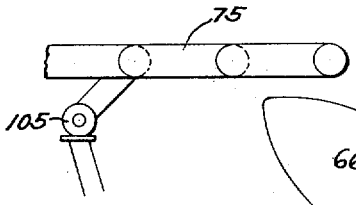
Figure 3:
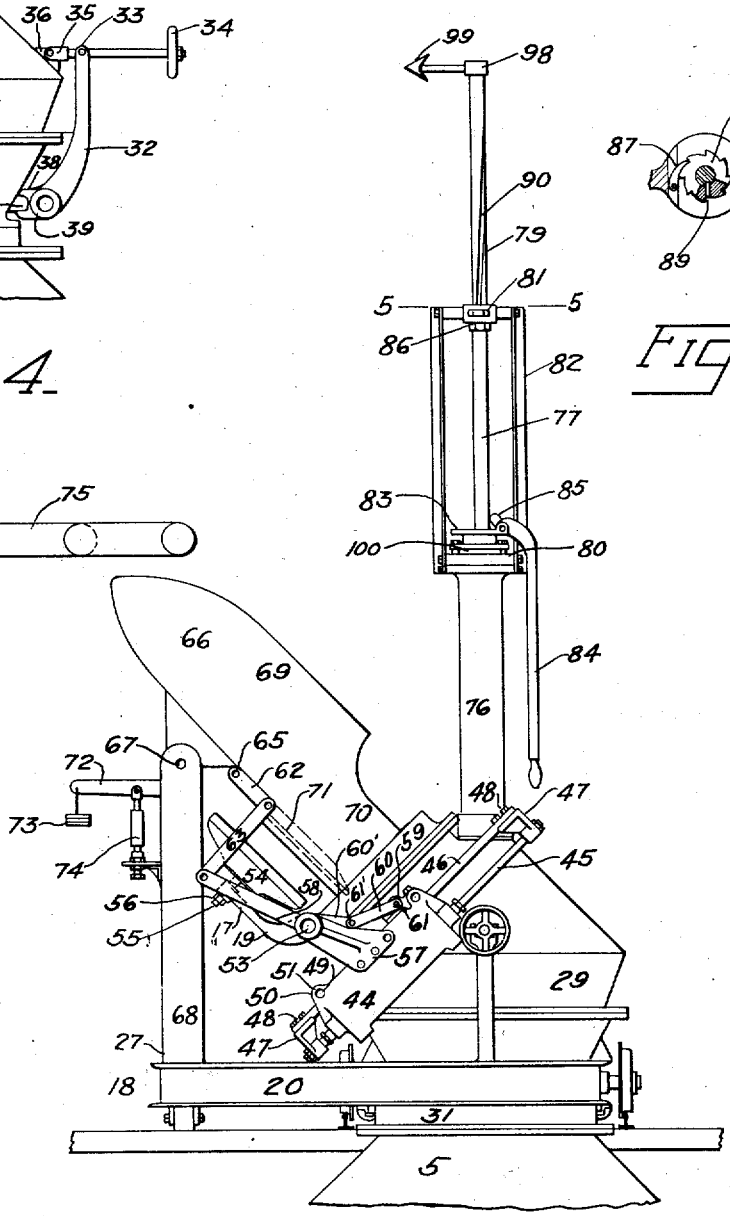

Other objects and advantages will appear from the following detailed description taken in connection with the accompanying drawings in which Fig. 1 is a fragmentary elevational view, partly broken away, showing the top portion of a generator of a gas plant and illustrating a preferred embodiment of this invention; Fig. 2 is a plan view corresponding to Fig. 1 with the conveyor removed; Fig. 3 is a side elevation, on an enlarged scale, corresponding to Fig. 1 and showing the fuel container in communication with the fuel nozzle, including all of the hydraulic cylinder, the hand operating mechanism and associated parts; Fig. 4 is a fragmentary detail view of the elevating and lowering mechanism for the magazine of the charging device; Fig. 5 is a fragmentary section taken on the line 5—5 of Fig. 3 and Fig. 6 is a fragmentary detail showing the magazine in gas-tight engagement with the generator of a gas plant.

In the preferred embodiment of the invention illustrated on the drawings, 5 indicates the top portion of a generator of a gas plant or set.

A truck or carriage 18 comprising a channel iron frame 20 secured together by plates 21 and a central cross channel iron or bar 22 has axles 23 extending through one side 24 of the frame and through the central channel bar 22. Secured to axles 23 are car wheels 25 adapted to run on rails 26. Supporting casters 28 are mounted on the side 27 of the truck or carriage.

A magazine 29, which may be supported on the carriage by shoulders 30 resting on the side 24 and on the center channel iron 22 when the charger is not in position over the charging opening and which when moved over the charging opening is supported by lugs 39 engaging lugs 40, as will more fully appear from the following description, is placed over a casting or nozzle 31 positioned at the top of the generator 5. This magazine is adapted to be lowered into gas-tight engagement with the casting 31 by means of lever arms pivotally mounted on the axles 23. One end 33 of these arms 32 is threaded onto a hand screw 34 which is fitted for rotation in a shackle 35 that is secured to a T-plate 36 on the magazine 29. The other end of arms 32 is divided into an upper lug 38 and a lower lug 39.

These lugs 38 and 39 are adapted to bear against lugs 40 on the side of the magazine 29 so that when the hand screw 34 is turned in one direction the lower lug 39 will bear against lug 40 thereby raising the magazine, and when the screw 34 is turned in the opposite direction the upper lug 38 will press against lug 40 forcing the magazine downward.

When the carriage 18 is wheeled into position over the casting 31, the magazine 29 is supported in spaced position thereover by lugs 39 engaging lugs 40. Movement of the screw 34 so that the end 33 is moved towards the left, viewing Fig. 4, causes lug 38 to contact with lug 40 forcing the magazine downwardly and swinging the axle 23 and the carriage 19 upwardly about the point of contact between lugs 38 and 40 as a pivot. Channel plates 22 and 24 of the carriage or truck have positioned on their underside dogs 41, and this upward movement of the carriage causes these dogs to engage projections 42 on the nozzle 31. There is thus an upward thrust on the casting 31 and a downward pressure on the magazine 29 exerted by lugs 38 contacting with lugs 40 so that a gas-tight joint is obtained between the magazine and the generator. When it is desired to remove the charging device for inspection, repair or other purposes, the screw 34 is turned so that lugs 39 move into contact with lugs 40 thus simultaneously lowering the axles 23 and carriage 18 so that the wheels 25 of the carriage contact with the rails 26. Further movement of screw 34 serves to elevate the magazine 29, lugs 39 moving about the axle 23 as a pivot contacting with lug 40 and elevating the magazine. The charging device can then be readily moved to any desired position.

A fuel nozzle 43 having a cover seat 104 around the top edge thereof is suitably positioned on the magazine 29. Fastened to the side of the magazine adjacent the nozzle 43 is a hydraulic motor or cylinder 44 having mounted therein a piston shaft 45 that has a rack 46 secured thereto by means of bracket 47 and bolts 48. A guideway 49 and roller brackets 50 having rolls 51 therein are provided for guiding the rack 46.

Shaft supports 52 extend from the fuel nozzle 43 and a supporting bracket 57 extends from the hydraulic cylinder 44. A shaft 53 is rotatably mounted in the supporting brackets 52 and 57 and has secured thereto an arm 19 the end 17 of which is connected to a nozzle cover 54 by a bolt 55 and nut 56. Lever 58 is secured to shaft 53 and is connected by a link 63 to a lever 62 secured to a shaft 65 positioned in a fuel container 66 pivoted on bearing pin 67 positioned through supports 68 extending up from the side 27 of the carriage frame. The shaft 53 is rocked by the reciprocatory movement of the piston rod 45 operated by the admission and discharge of a suitable pressure fluid into and from the hydraulic cylinder 44, through rack 46, clip 59 secured thereto and link 60 connected by pin 61 to clip 59 and by pin 61′ to lever 60′ secured to shaft 53.

The container 66 is provided with an open portion 69 and an enclosed chute end 70 leading therefrom. In this chute secured to the shaft 65 is a check gate 71. Mounted on the supports 68 and connected with the pin 67 is a scale that has a weight arm 72 and a weight platform 73.

An electric switch 74 is connected with the arm 72 so that power supplied by an electric motor 105 to drive the conveyor 75 overhanging the container 66 can be automatically shut off when a predetermined amount or weight of fuel is deposited in the container 66.

A hydraulic cylinder 76, mounted on the top of the magazine 29 is provided with a piston rod 77, of which the lower portion 78 extends down into the magazine 29, and the upper portion 79 extends through a stuffing box 80, a packing gland 100 and a ratchet casing 81 which is held by supports 82 bolted or otherwise secured to the cylinder 76. Loosely positioned around the rod 77 is a collar 83 on which is pivotally mounted a hand lever 84 provided with a protruding end or tooth 85. A sprocket gear 86 is keyed or otherwise secured to the rod 77 just below the ratchet casing 81. Pivoted on the inside of the ratchet casing 81, as shown in Fig. 5, is a pawl 87 which is arranged to engage the teeth of a ratchet gear or wheel 88 having an inside pin 89 projecting into a spiral groove 90 formed in the rod 77.

It will be noted that the rod 77 may be raised and lowered by the hydraulic cylinder 76 the distance between the stuffing box 80 and the casing 81. On the down stroke, the pin 89 in groove 90 turns the ratchet wheel or gear 88 so that the teeth thereof pass pawl 87, the ratchet wheel 88 and pin 89 moving relative to the shaft 77 which is thus maintained in fixed or non-rotatable position. On the return stroke the pawl 87 sets in one of the teeth of the ratchet wheel 88 preventing it from turning and thus holding the pin 89 fixed or stationary, so that the rod 77 is moved relative to the ratchet wheel or gear 88 by the pin 89 traveling in the spiral groove 90.

It will be further noted that if it is desired to turn the rod 77 to any particular point, pawl 87 is disengaged from the teeth of the ratchet gear 88 and the collar 83 with the hand lever 84 is moved or slid up on rod 77 and thereafter the hand lever 84 is raised horizontally so that the tooth 85 sets between the teeth of the gear 86. By turning the hand lever 84 in a horizontal plane, the rod 77 can be rotated until the lever 84 engages one of the supports 82. If it is desired to further rotate the rod 77 the lever 84 is lowered, disengaging the tooth 85 from the gear 86, then the collar 83 is rotated in a reverse direction and thereafter the tooth 85 is again moved into engagement with the gear 86 and the operation above described repeated.

The lower portion 78 of the rod 77 is held in position by bearing 91 supported by cross beams 92, secured to the inside facing of the magazine. Placed on the end of this portion 78 is a spreader 93 that has an outwardly beveled bottom 94. This bottom 94 when the spreader is in closed position, wedges against a shoulder 95 on the inside of the magazine 29 making a gas-tight joint and at the same time leaves the spreader 93 clear of the generator top and nozzle 31 so that the charger may be moved with the carriage 19 when desired. The spreader 93 has an inclined or slanted face 96 extending diagonally from the top edge 97 to the bottom 94. On the extreme end of the upper portion 79 of the rod 77 is positioned a block 98 having an indicating arrow 99 to indicate the position of the spreader 93.

In operation, the magazine of the charging machine is placed over the generator 5 of the gas plant or set, lowered and secured to the nozzle 31 by manipulating the hand screws 34, as heretofore described. The fuel container 66, if not in a horizontal position as indicated in Fig. 1, is moved thereto by the action of the hydraulic cylinder 44 which through rack 46 and levers 60 and 60′ rocks the shaft 53, thus moving levers 58, 63 and 62 to rock shaft 65, moving gate 71 from the dotted line position shown in Fig. 3 to the position shown in Fig. 1 so that the gate 71 engages the chute end 70 of container 66. Further movement of levers 58, 62 and 63 acts to swing container 66 about the pin 67 as a pivot into horizontal position thereby moving the weight lever 72 downwardly to close the switch 74. Movement of shaft 53 also swings lever 19 to position cover 54 in gas-tight engagement with the opening in the fuel nozzle 43.

Closing of the switch 74 sets the conveyor 75 in motion so that fuel is delivered thereby to hopper or container 66. When a weighed or predetermined amount of fuel has been delivered to the container 66, this container gravitates about 67 as a pivot, causing weight lever 72 to move upwardly opening switch 74 and stopping the conveyor 75. Simultaneously with this rocking movement of container 66, hydraulic cylinder 44 moves rack 46 and rocks shaft 53 to move lever 19 and remove the cover 54 so that the chute end 70 of container 66 can move into open communication with the fuel nozzle 43. The leverage and the operation of the hydraulic cylinder 44 are so arranged that the raising of the cover 54 and the tilting of the container 66, positioning the chute 70 adjacent the fuel nozzle opening do not interfere with each other.

This rocking movement imparted to shaft 53 does not at this stage of the operation move shaft 65 and the check gate 71 secured thereto through the connecting levers 58, 62 and 63 as the gravitational movement of the container 66 about bearing pin 67 results in a lowering of end 70 of the container and thus prevents lever 63 from rocking shaft 65 since there is no relative movement during the pivotal descent of container 66 between levers 63 and 62. The fuel is consequently maintained in the container 66 by the check gate 71. However, when the container 66 is in open communication with the fuel nozzle 43 further movement of rack 46 acts to further rock shaft 53 to move levers 58, 63 and 62 to rock shaft 65 lowering gate 71 and permitting the charge to pass into the magazine 29. After fuel is placed in the magazine, the container 66 and the cover 54 are returned to position indicated in Fig. 1 by reverse movement of the rack and levers.

The charge having been delivered to the magazine 29, the spreader 93 is then lowered by the hydraulic cylinder 76 and the inclined face 96 places the fuel over a limited or predetermined area or portion of the fuel bed in the generator 5. When the spreader is raised it is turned by the action of groove 90 cooperating with the pin 89, pawl 87 and the ratchet 88, so that a succeeding section of the generator may be charged on the next down stroke of the spreader. This operation of the spreader occurs at frequent intervals thereby resulting in an even distribution of fuel over the entire fuel bed surface.

If it is desired to deposit fuel to any particular portion of the fuel bed, pawl 87 is disengaged from the ratchet 88 and the rod 77 is positioned by means of hand lever 84 as hereinbefore described.

It will be noted that in accordance with the present invention the spreader 93 functions to feed fuel to only a definite or predetermined portion of the fuel bed during each cycle of operation when the spreader is lowered into the generator and does not feed the fuel indiscriminately to the entire top surface of the fuel bed as in the prior art devices in which a continuously rotating valve element or conical-shaped member, as in the patent to J. A. Herrick No. 1,119,280, is utilized.

It is obvious that various changes may be made in the arrangement, combination and construction of the various parts of the charging machine without departing from the spirit of my invention, and this invention is accordingly not to be limited to the subject matter disclosed but only by the scope of the appended claims.

I claim:

1. A charging device comprising a carriage, a magazine on said carriage, means on said carriage for weighing fuel, means on said carriage for supplying said weighed fuel to said magazine and means within said magazine for supplying said fuel to the fuel bed.

2. In combination with a generator of a gas plant, a carriage, a magazine mounted thereon and removably secured to said generator, a fuel container on said carriage separate from and positioned adjacent to said magazine, means for supplying fuel to said container and means for moving said container to feed fuel to said magazine from said container.

3. In combination with a generator of a gas plant, a carriage, a magazine mounted thereon and removably secured to said generator, means on said carriage separate from and positioned adjacent to said magazine, for supplying said magazine with fuel and means for charging fuel to predetermined portions of said generator from said magazine.

4. In combination with a generator of a gas plant, a carriage, a magazine mounted thereon and removably secured to said generator, a fuel container on said carriage separate from and positioned adjacent to said magazine, means for supplying fuel to said magazine from said container, a spreader adapted to fit into said magazine and means for lowering said spreader to charge said generator with fuel from the magazine.

5. In combination with a generator of a gas plant, a carriage, a magazine mounted thereon and removably secured to said generator, a fuel container, a fuel conveyor for supplying fuel to said container, means for loading fuel into said magazine from said container, a spreader adapted to fit into said magazine and means for lowering said spreader to charge said generator with fuel from the magazine.

6. In combination, a carriage, a magazine mounted thereon, a fuel container, a conveyor for supplying fuel to said container, means for weighing the fuel in said container, and means for feeding fuel into said magazine from said container.

7. A charger comprising a carriage, a magazine mounted thereon, a fuel nozzle extending up from said magazine, a gas tight cover for said fuel nozzle adapted to be opened by movement away from said magazine, means for opening and closing said cover and a fuel container on said carriage arranged to empty into said nozzle for loading said magazine with fuel through said nozzle.

8. In a charging device for gas generators, a magazine, a fuel nozzle on said magazine, a cover for said nozzle, a fuel container arranged to move into communication with said fuel nozzle, a check gate in said container, means for removing said cover as said fuel container moves into communication with said fuel nozzle and means for moving said check gate when said container is in communication with said nozzle.

9. In a charging device for gas generators, in combination, a magazine, a fuel nozzle on said magazine, a cover for said nozzle, a container, a check gate in said container, and means for synchronously moving said cover said container and said check gate.

10. A charger comprising a carriage, a magazine mounted thereon, a fuel nozzle extending from said magazine, a fuel container on said carriage separate from and positioned adjacent to said magazine and having a chute end leading therefrom, a gate in said chute adapted to close the same and means for opening said gate and loading said magazine with fuel from said container through said nozzle.

11. A charger comprising a carriage, a magazine mounted thereon, means for raising and lowering said magazine from and on said carriage, a fuel nozzle extending from said magazine, a fuel container on said carriage separate from and positioned adjacent to said magazine, means for loading said magazine with fuel from said container through said nozzle and means for feeding the fuel from said magazine.

12. A charging device for gas generators comprising a truck, a magazine on said truck and adapted to be secured in position over the charging opening of a gas generator, and means for elevating said truck frame and thus effecting gas tight engagement between said magazine and said generator.

13. A charging device for gas generators comprising a truck, a magazine mounted upon said truck and adapted to be secured in position over the charging opening of a gas generator, a lug on said magazine, a lever pivotally mounted on said truck and arranged to engage said lug, and means for moving said lever to engage said lug, thereby elevating the truck and effecting a gas tight engagement between the magazine and said generator.

14. A charging device for gas generators comprising a truck having hooks on the frame thereof, a magazine on said truck and adapted to be secured in position over the charging opening of a gas generator, a lug on said magazine, a lever pivotally mounted on said truck and adapted to engage said lug, a casting on the generator provided with extending lugs and means for moving said lever to engage said lug on the magazine thereby elevating the truck causing the hooks to engage the extending lugs on said nozzle and forcing the magazine into gas tight engagement with said generator.

15. A charger comprising a carriage, a magazine mounted thereon, a fuel nozzle extending up from said magazine and a gas tight cover for said nozzle, a fuel container having a chute end leading therefrom, a gate in said chute adapted to close the same and means for simultaneously opening said cover, tilting said container so that the chute end will be adjacent said nozzle and opening said gate, thereby permitting fuel to pass from said container through said nozzle into said magazine.

16. A charger comprising a carriage, a magazine mounted thereon, a fuel nozzle extending up from said magazine and a gas tight cover for said nozzle, a fuel container having a chute end leading therefrom, a gate in said chute adapted to close the same, a hydraulic cylinder secured to the side of said nozzle and means operated by said cylinder for simultaneously opening said cover, tilting said container so that the chute end will be adjacent said nozzle and opening said gate, thereby permitting fuel to pass from said container through said nozzle into said magazine.

17. In combination, a carriage, a magazine mounted thereon, a fuel nozzle extending up from said magazine, shaft supports on said nozzle having a shaft positioned therein, a gas tight cover for said nozzle secured to said shaft, a hydraulic cylinder, a piston rod extending from both ends of said cylinder, means for reciprocating said rod in said cylinder, a rack placed on said piston rod, a fuel container having a chute end, a gate in said chute and means connecting said shaft, gate and rack, whereby said cover can be moved simultaneously with the tilting of said container and the opening of said gate by said piston rod.

18. In combination, a carriage, a magazine mounted thereon, a fuel nozzle extending up from said magazine, shaft supports on said nozzle, a shaft positioned therein, a gas tight cover for said nozzle secured to said shaft, a lever fulcrumed on said shaft, a fuel container having a chute end, a gate in said chute, means connecting said gate with one end of said lever, a hydraulic cylinder positioned on said nozzle, a piston rod extending from both ends of said cylinder, means for reciprocating said rod in said cylinder, a rack placed on said piston rod and means connecting said rack with the other end of said lever so that reciprocation of said piston rod will cause simultaneous movement of said cover and container and delayed movement of said gate.

19. In combination, a carriage, a magazine mounted thereon, means on said carriage for weighing fuel, means on said carriage for feeding said weighed fuel to said magazine, a hydraulic cylinder secured to the top of said magazine, a piston rod extending down into said magazine from said cylinder and a spreader arranged to receive said fuel and secured to the end of said rod adapted to form a gas tight bottom for said magazine.

20. A construction as set forth in claim 19 wherein the spreader has an inclined surface, a shoulder is placed around the inside of said magazine adjacent the bottom thereof and the bottom of said spreader is beveled to form a gas tight joint when in closed position.

21. In combination, a carriage, a magazine mounted thereon, means for supplying said magazine with fuel, a hydraulic cylinder secured to the top of said magazine, a casing supported above said cylinder, a piston rod in said cylinder having the lower end extending down into said magazine and the upper end through said casing, means for reciprocating said piston rod in said cylinder, and means in said casing for partially rotating said rod.

22. In combination, a carriage, a magazine mounted thereon, means for supplying said magazine with fuel, a hydraulic cylinder secured to the top of said magazine, a casing supported above said cylinder, a piston rod in said cylinder having the lower end extending down into said magazine and the upper portion through said casing, a spreader secured to the lower end of said rod and adapted to form a gas tight bottom for said magazine, when in closed position, means for reciprocating said piston rod in said cylinder and means in said casing for partially rotating said rod on each complete stroke, thereby changing the position of said spreader.

23. In combination, a carriage, a magazine mounted thereon, means for supplying said magazine with fuel, a hydraulic cylinder secured to the top of said magazine, a casing supported above said cylinder, a piston rod in said cylinder having the lower end extending down into said magazine and the upper portion through said casing, a spreader secured to the lower end of said rod and adapted to form a gas tight bottom for said magazine when in closed position, means for reciprocating said piston rod in said cylinder, a spiral groove in the upper portion of said rod, a ratchet gear having an inside pin, projecting into said groove, fixed for rotation in said casing and a pawl adapted to allow free movement of said ratchet on the downstroke of said rod and to become set in the teeth of said ratchet on the up stroke, thereby partially rotating the rod to change the position of said spreader.

24. In combination, a carriage, a magazine mounted thereon, means for supplying said magazine with fuel, a hydraulic cylinder secured to the top of said magazine, a casing supported above said cylinder, a piston rod in said cylinder having the lower end extending down into said magazine and the upper portion through said casing, means for reciprocating said piston rod in said cylinder and means for turning said rod, consisting of a gear keyed to said rod below said casing, a collar loosely positioned on the rod adjacent said cylinder, a hand lever pivoted to said collar and a projecting end on said hand lever adapted to be inserted between the teeth of said gear when the rod is at the end of its down stroke, by raising said hand lever to a horizontal position.

25. In combination, a carriage, a magazine mounted thereon, means for supplying said magazine with fuel, a hydraulic cylinder secured to the top of said magazine, a casing supported above said cylinder, a piston rod in said cylinder, having the lower end extending down into said magazine and the upper portion through said casing, a spreader secured to the lower end of said rod, means for reciprocating said piston rod in said cylinder, means for turning said rod and spreader, consisting of a gear keyed to said rod below said casing, a collar loosely positioned around said rod adjacent said cylinder, a hand lever pivoted to said collar and a projecting end on said hand lever adapted to be inserted between the teeth of said gear when the rod is at the end of its down stroke by raising said hand lever to a horizontal position and automatic means in said casing for partially rotating said rod on each complete stroke thereby changing the position of said spreader.

In witness whereof I have hereto set my hand.

GEORGE R. STEERE.